UNITED STATES PATENT OFFICE.

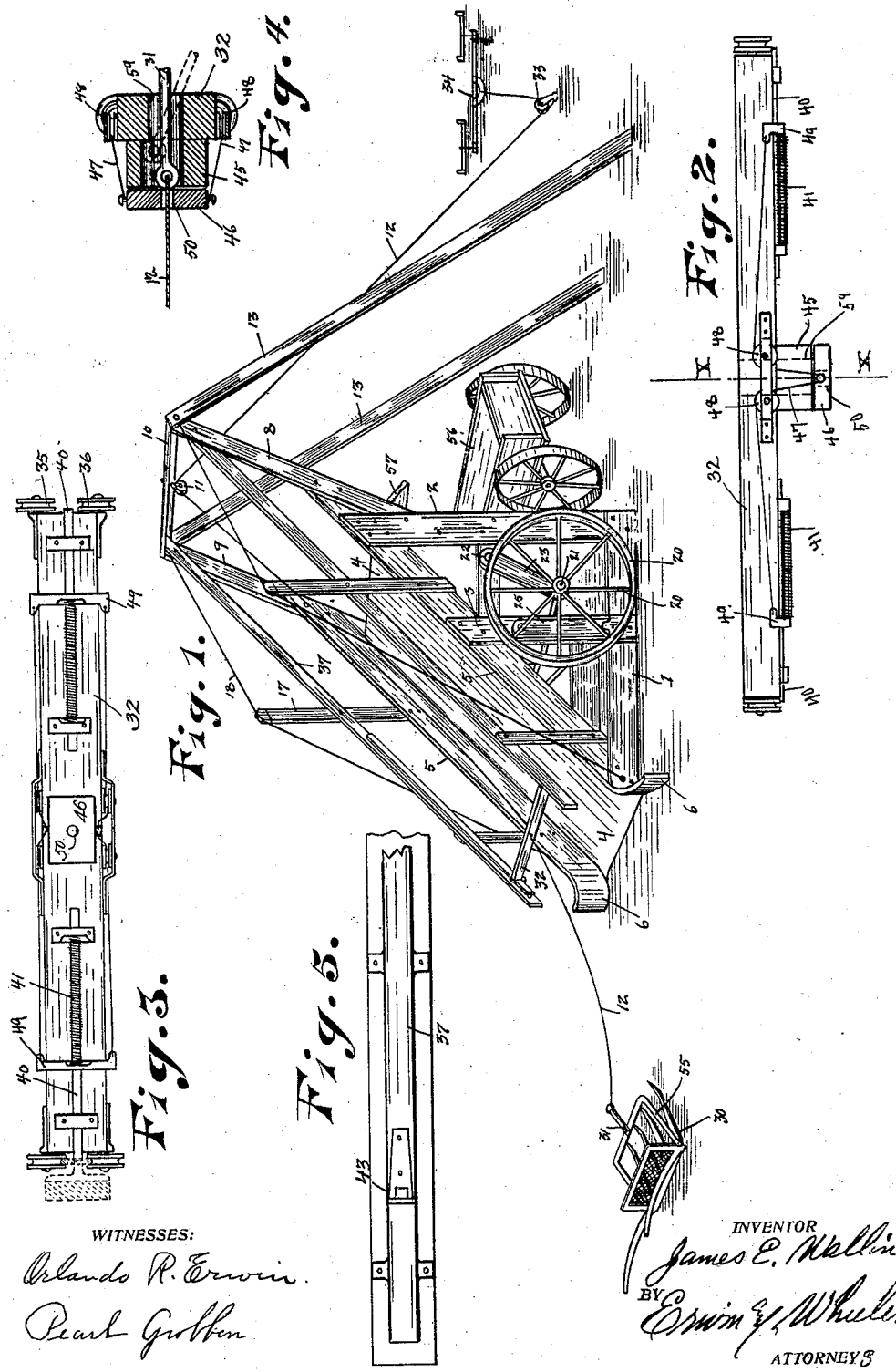

JAMES E. WALLIN, OF EDGERTON, WISCONSIN.

LOADER.

No. 842,925.  Specification of Letters Patent.  Patented Feb. 5, 1907.

Application filed June 14, 1906. Serial No. 321,625.

*To all whom it may concern:*

Be it known that I, JAMES E. WALLIN, a citizen of the United States, residing at Edgerton, county of Rock, and State of Wisconsin, have invented new and useful Improvements in Loaders, of which the following is a specification.

My invention relates to improvements in loaders, with especial reference to that class of devices which are used for cleaning barnyards or for grading, excavating, &c., where it is desirable to use a portable structure which can be readily shifted from place to place.

The object of this invention is to provide a supporting-incline for the scraper or fork in connection with controlling devices, whereby the fork when delivered to the incline may be drawn up thereon, dumped, and returned to the foot of the incline without attendance.

A further object of my invention is to provide means whereby the structure may be readily moved from place to place and held in any position of adjustment with sufficient rigidity for the desired purpose.

In the following description reference is had to the accompanying drawings, in which—

Figure 1 is a perspective view of my invention. Fig. 2 is a plan view of the controlling-beam. Fig. 3 is a view of the same as seen from the upper side. Fig. 4 is a sectional view drawn on line $x$ $x$ of Fig. 2, and Fig. 5 is a detail side view of a portion of one of the track-rails.

Like parts are identified by the same reference characters throughout the several views.

A supporting-frame comprising horizontal bars 1 and standards 2 and 3 is used to support an inclined platform 4, having raised sides 5, outwardly curved at their lower ends 6. Frame-bars 8 and 9 are used to support a cross-piece 10, which carries a pulley 11, through which the draft-rope 12 passes. Braces 13 are connected to the upper portion of the frame, formed by the bars 8, 9, and 10, and the sides 5 of the platform are provided with posts 17, over which stays 18 are passed and connected to the lower frame-bars 1 and to the upper portion of the frame near the bar 10, whereby a rigid structure is produced.

Wheels 20 are mounted upon an axle-shaft 21, which is supported from a cross-shaft 22 by links 23. When the links are swung to a vertical position, the wheel-rims extend below the frame-bars 1, which are then supported by the wheels in a raised position, so that the device may be readily moved from place to place. Pivoted bars 25, connected with the standards 3, may be swung into a position to engage the axle-shaft 21 to lock the wheels in the position of use. When the apparatus is adjusted for use, the bars 25 are swung outwardly to their normal position, as shown in Fig. 1, thus permitting the links 23 to swing to an angular position, whereupon the frame is permitted to rest upon the ground, as shown in Fig. 3.

The scoop, comprising a scraper or fork 30, is provided with a link 31, to which the draft-rope 12 is connected. The rope passes from this point of connection through an aperture in the controlling-bar 32 and upwardly above the incline 4, over the pulley 11, and then downwardly around a pulley 33 to the draft appliances 34. The controlling-bar 32 is provided with pulleys 35 and 36 at each end, which engage the upper and lower margins of track-rails 37, whereby the bar is guided and supported by the track-rails and permitted to move thereon along the incline.

When the scoop 30 is on the ground, the controlling-bar 32 occupies a position near the lower ends of the track-rails 37 and is locked in that position by latch-bars 40, which are actuated by springs 41, arranged to move the latch-bars outwardly into position to engage catches 43 on the track-rails 37. When the scoop is delivered to the inclined platform 4, the latch-bars 40 are retracted automatically to release the controlling-bar and permit it to move upwardly along the track-rails with the scoop. This release of the controlling-bar is accomplished by providing an aperture in the controlling-bar of sufficient size to receive the link 31. A block 45, similarly apertured, is secured to the upper rear side of the controlling-bar, and another block 46 is supported in a position to cover said aperture by means of flexible supporting connections 47, which are passed over pulleys 48 on the controlling-bar and connected with cross-arms 49 on the respective latch-bars 40. The block 46 is provided with a smaller aperture 50, through which the draft-rope 12 passes. This aperture, however, is too small for the passage of the link 31, so that when the link strikes the block 46 it pushes such block forcibly away from the block 45 and draws upon the cables 47, thus retracting the latch-bars 40 against the tension of their actuating-springs. The latches 40 are retracted simultaneously, thus releasing the controlling-bar, which then passes upwardly along the incline and guides the scoop to the upper end thereof. The link 31 is connected to the scoop by means of a pulley 55, which permits the scoop to automatically tilt under the weight of the load and dump the contents into the wagon 56. The incline 4 is preferably provided with a downwardly-inclined extension 57 at its upper end, which guides the contents of the scoop to the wagon.

It will be observed that the aperture in the block 45 is eccentrically formed with reference to the aperture 59 in the controlling-bar, whereby the link locks in the aperture by swinging to an angular position under the weight of the scoop when the latter passes over the upper end of the incline 4. The object of this construction is to prevent the scoop from settling to the wagon when the draft-rope slackens, for since the link 31 is locked to the controlling-bar the latter, together with the scoop, will necessarily move downwardly along the incline by gravity as soon as permitted to do so by the draft-rope. The locked position of the link 31 is indicated by dotted lines in Fig. 4.

In operation the wagon 56 is adjusted underneath the downwardly-inclined extension 57 of the platform 4, the brace-bars 13 being arranged to permit the wagon to pass between them and the platform-supporting frame. The draft-rope is of sufficient length to permit the scoop to be carried to any convenient point where it is desired to fill the same, and the scoop is then drawn by the draft-rope toward the inclined platform 4 until the link member 31 enters the aperture 59 in the controlling-bar and releases the bar by engaging the member 46, whereupon the controlling-bar will move upwardly along the track-rails and the scoop will move upwardly along the platform 4 until it reaches the upper end and then dumps the contents into the wagon. The draft-rope is then slackened and the scoop and controlling-bar return by gravity to the lower end of the platform 4, when the controlling-bar will be automatically locked into position by the spring-actuated latches 40 engaging the catches 43.

Having thus described my invention, what I claim as new, and desire to secure by Letters Patent, is—

1. In apparatus of the described class, the combination of a supporting-frame; a scoop; an inclined platform connected with the supporting-frame; inclined track-rails also connected with the supporting-frame; and a controlling-bar adapted to travel along said track-rails; together with means for locking the controlling-bar to the track-rails near the lower ends thereof; and a releasing device adapted to be actuated by the scoop.

2. In apparatus of the described class, the combination of a supporting-frame; a scoop; an inclined platform connected with the supporting-frame; inclined track-rails also connected with the supporting-frame; and a controlling-bar adapted to travel along said track-rails; together with means for locking the controlling-bar to the track-rails near the lower ends thereof; and a releasing device adapted to be actuated by the scoop, said locking means comprising spring-actuated latches on the controlling-bar and catches on the track-wheels.

3. In apparatus of the described class, the combination of a supporting-frame; a scoop; an inclined platform connected with the supporting-frame; inclined track-rails also connected with the supporting-frame; and a controlling-bar adapted to travel along said track-rails; together with means for locking the controlling-bar to the track-rails near the lower ends thereof; and a releasing device adapted to be actuated by the scoop, said releasing device comprising a removable member connected with the controlling-bar and adapted to be engaged and actuated by a member connected with the scoop; and flexible connections between the movable member; and locking means for the controlling-bar.

4. In apparatus of the described class, the combination with a supporting-frame; an inclined platform connected therewith; a scoop adapted to travel along said platform; and a draft-rope connected therewith and guided by said frame, together with a set of supporting-wheels having link connection with the frame; pivoted locking-bars to hold the wheels in supporting position and means for adjusting said wheels to a non-supporting position.

5. In apparatus of the described class, the combination with an inclined platform; of a set of track-rails; a controlling-bar adapted to move along the track-rails; a scoop provided with a draft-rope arranged to pass through an aperture in the controlling-bar; and a rigid member connected with said scoop and adapted to enter said aperture; said member being adapted to lock in said aperture by cramping when subjected to the weight of the scoop.

6. In apparatus of the described class, the combination with an inclined platform; a scoop; a draft-rope connected therewith; of a controlling-bar mounted in a suitable support and adapted to travel along said platform, said controlling-bar having an aperture for the reception of the draft-rope; spring-actuated locking devices for the controlling-bar; a releasing member connected with the controlling-bar and covering the draft-rope aperture therein; connections between the releasing member and the locking devices; and a member connected with the scoop and adapted to enter the aperture in the controlling-bar and to engage and actuate said releasing member, whereby the locking devices may be retracted to unlocking position.

In testimony whereof I affix my signature in the presence of two witnesses.

JAMES E. WALLIN.

Witnesses:
  J. P. TOWNE,
  E. A. ROBERTS.